June 8, 1965

R. C. SIMMONS 3,187,860

PORTABLE NUT RUNNER HAVING AUTOMATIC SPEED
CHANGE AND AUTOMATIC SHUT-OFF

Filed Jan. 24, 1963

INVENTOR.
ROGER C. SIMMONS

BY
Raymond G. Mullee
ATTORNEY

June 8, 1965

R. C. SIMMONS 3,187,860

PORTABLE NUT RUNNER HAVING AUTOMATIC SPEED
CHANGE AND AUTOMATIC SHUT-OFF

Filed Jan. 24, 1963

INVENTOR.
ROGER C. SIMMONS

BY
Raymond G. Mullee

ATTORNEY

June 8, 1965  R. C. SIMMONS  3,187,860
PORTABLE NUT RUNNER HAVING AUTOMATIC SPEED
CHANGE AND AUTOMATIC SHUT-OFF
Filed Jan. 24, 1963  3 Sheets-Sheet 3
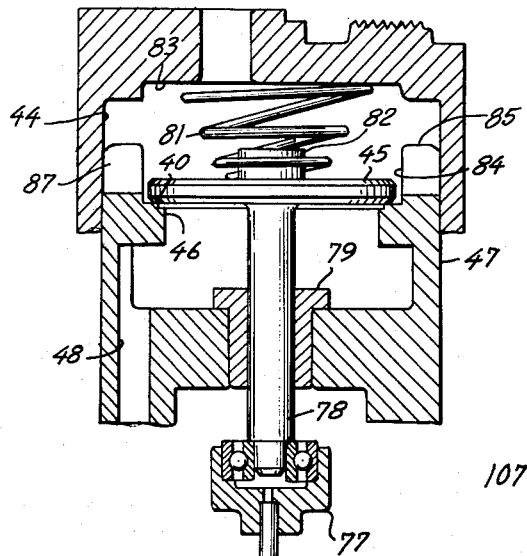
FIG. 8
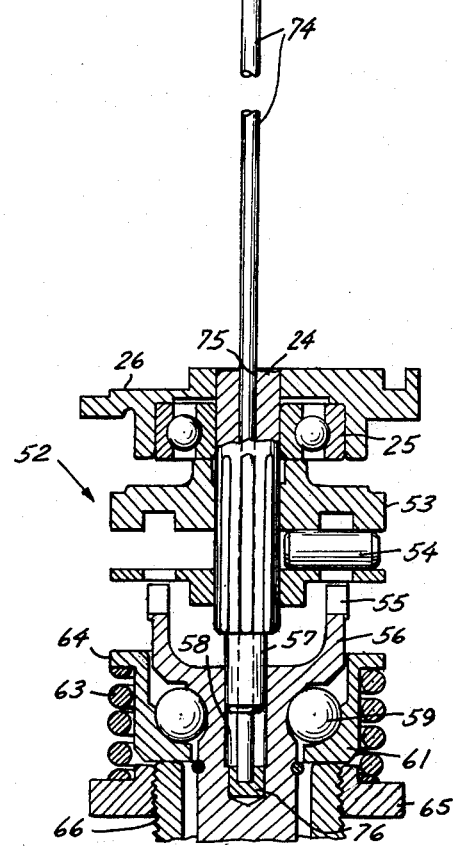
FIG. 6
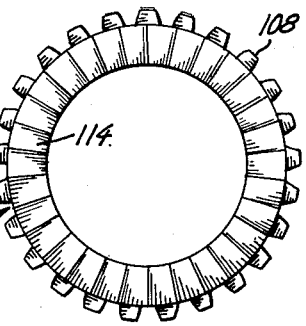
FIG. 7
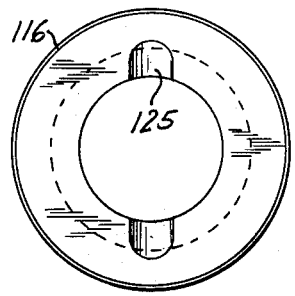
INVENTOR.
ROGER C. SIMMONS
BY
Raymond H. Mullee
ATTORNEY United States Patent Office 3,187,860
Patented June 8, 1965

3,187,860
PORTABLE NUT RUNNER HAVING AUTOMATIC SPEED CHANGE AND AUTOMATIC SHUT-OFF
Roger C. Simmons, New Hartford, N.Y., assignor to Chicago Pneumatic Tool Company, New York, N.Y., a corporation of New Jersey
Filed Jan. 24, 1963, Ser. No. 253,538
19 Claims. (Cl. 192—.092)

This invention is concerned with a power operated rotary tool for driving threaded fasteners, such as nuts and screws. Such tools are commonly known as nut runners.

A general object of the invention is to provide a nut runner capable of operating at high speed with low torque to rapidly run down a fastener to an initial tightness; then of automatically shifting gears to drive the fastener at low speed with high torque to finally tighten the fastener to a desired degree. Another object is to automatically stop the operation when the fastener has been finally tightened.

A further object of the invention is to provide a nut runner of the foregoing capacity which can be comfortably and operatively held in one hand anywhere along the body of the tool.

A still further object of the invention is to provide a nut runner having two stages of reduction gearing so arranged relative to a work shaft that the shaft is caused to be initially driven directly by one stage until it experiences a predetermined initial degree of torque resistance; and when the latter is experienced, the first stage is caused to automatically release its direct driving relation with the work shaft and is caused to drive the shaft indirectly through the second stage.

Still another object of the invention is to provide downshift mechanism in a nut running tool having the foregoing mentioned two stages of reduction gearing, which senses when the work spindle has realized a predetermined initial degree of torque resistance and thereupon automatically down-shifts the driving operation of the work shaft from the first stage to the second stage.

A further object of the invention is to provide an angle nut runner adapted to be operatively and comfortably held in one hand, which has the foregoing mentioned two stage speed gearing and associated down-shift mechanism.

In accordance with the invention there is provided a nut running tool of compact size adapted to be comfortably and operatively held in one hand and having: an air driven motor; a work spindle connected by angle gearing to a work shaft; a first stage of planetary reduction gearing connected by a high torque cam release clutch to the motor, drivingly connected to a second stage of planetary gearing and drivingly connected to the work spindle by a low torque cam release clutch; a normally fully disengaged shift clutch carried in part by the second stage of gearing and in part by the work spindle and adapted upon engagement to connect the second stage of gearing with the work spindle; shift means responsive to disengagement of the low torque cam release clutch to fully disengage the work spindle from direct driving engagement with the first planetary stage and to simultaneously engage the shift clutch so as to drivingly connect the work spindle with the second planetary stage; and control means responsive to disengagement of the high torque cam release clutch to abruptly shut off operating power to the motor.

A further object of the present invention is to provide a nut runner having a two speed gear arrangement including a pair of clutches, one for transmitting high speed drive and low torque to a nut engaging device and the other for transmitting low speed drive and high torque to the nut engaging device; wherein, the nature of the clutches and associated gear arrangement is such as to provide an advantageous mode of operation in transmitting drive to the nut engaging device during which neither of the clutches is caused to ratchet during the time that the other is operatively engaged.

A nut runner having a two-speed transmission device is known from British patent specification Number 808,-983. In the tool of the latter there is provided between the output shaft of a motor and a nut engaging member a two-speed gear arrangement having incorporated therein a pair of clutches. One of these clutches is a spring loaded slipping clutch which functions during the initial operation of the tool to transmit high speed and low torque to the nut engaging member. The other clutch is a free wheeling or overrunning clutch which functions automatically to connect the nut engaging member with a low speed drive so as to transmit low speed and high torque to the nut engaging member when the slipping clutch slips. An undesirable deficiency of this arrangement is that one part of the overrunning clutch continuously rides over its counterpart during the time that the slipping clutch is driving the nut engaging member. Another undesirable fault of this known device is that the slipping clutch continuously ratchets or slips during the time that the overrunning clutch is driving the nut engaging member. This ratcheting action, or repeated re-engagement of the clutch members produces undesirable noise, vibration and wear of the clutch members.

These deficiencies of the known art are avoided by the improved nut runner of the present invention. A pair of clutches are associated with a gear arrangement in the present invention between the output shaft of a motor and a nut engaging member. One of these clutches is a kick-out clutch which functions to transmit high speed and low torque drive to the nut engaging member until the latter experiences an initial predetermined torque resistance, whereupon the kick-out clutch automatically is caused to fully disengage and in the act of disengaging to cause a shift clutch to shift into engagement. The shift clutch upon becoming engaged functions to transmit low speed and high torque drive to the nut engaging member to "finally" tighten the nut. During the time that the kick-out clutch is engaged and driving the nut engaging member, the shift clutch is fully disengaged, and is prevented from re-engaging, so that the members of the shift clutch at this time rotate free and clear of one another without any undesirable surface contact, impacting or ratcheting action. When the kick-out clutch disengages it becomes fully disengaged, so that during the time that the shift clutch is engaged and driving the nut engaging member the clutch members of the kick-out clutch rotate free and clear of one another without any undesirable surface contact or ratcheting action.

Another feature of the nut runner of the present invention which is not present in the nut runner of the known British patent specification mentioned above is the provision of a third clutch between the output shaft of the motor and the nut engaging member. This third clutch is adapted to automatically disengage the output shaft of the motor from its driving association with the nut engaging member the instant that the nut experiences a predetermined final torque. Further means associated with the third clutch functions simultaneously with the disengaging action of the latter to forcefully follow one of the clutch parts of the third clutch to a fully disengaged condition, to hold it there and to simultaneously shut off operating power to the motor. This third clutch disengages without any accompanying ratcheting action; it becomes fully disengaged and held so the instant that a final tightness has been transmitted to the nut, so that the transmission of driving torque to the nut stops immediately upon full disengagement of the third clutch.

The invention further lies in the particular construction of its components, and also in their cooperative association with one another to effect the results intended herein.

The foregoing, as well as other objects and advantages of this invention will appear more fully hereinafter from a consideration of the detailed description which follows taken with reference to the accompanying drawings wherein an embodiment of the invention is illustrated. It is to be expressly understood, however, that the drawings are for purposes of illustration and description; they are not to be construed as defining the limits of the invention.

In the accompanying drawings:

FIG. 6 is an enlarged detail view of the upper face of the driving member of the shift clutch;

FIG. 7 is an enlarged detail view of the upper face of the driven shift clutch member; and FIG. 8 is a detail view showing the control valve in a seated condition holding the associated main clutch in fully disengaged condition.

Figure 1:
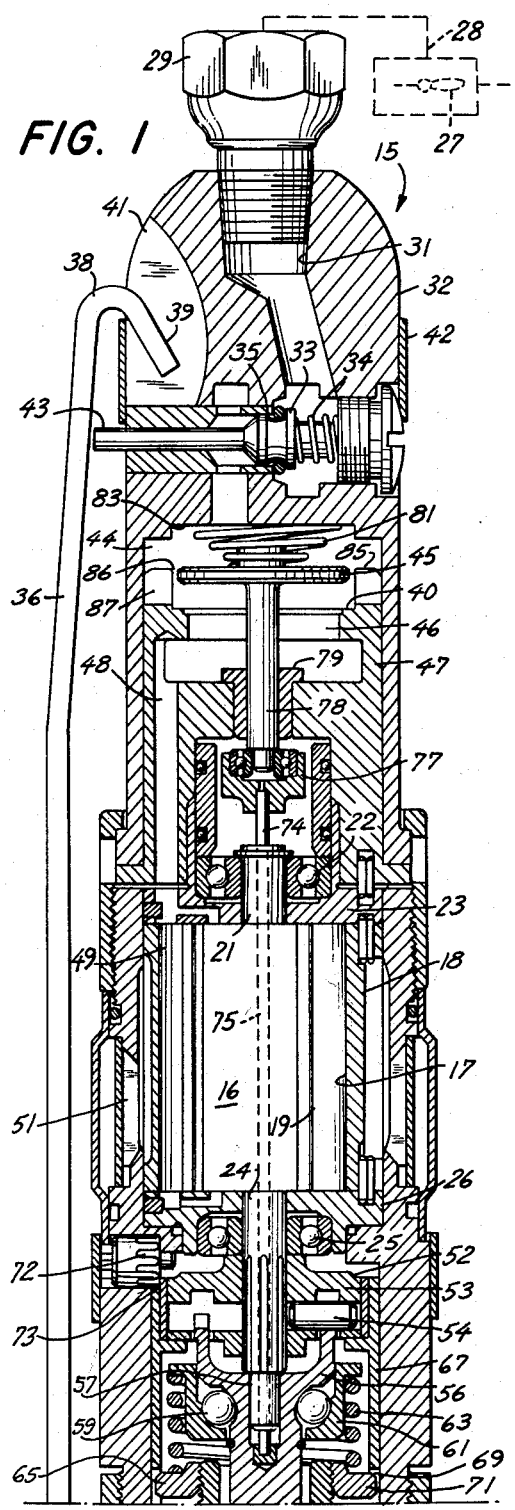
FIGS. 1 and 1A are continuations of one another, FIG. 1 representing the upper half of a nut running tool embodying the invention, and FIG. 1A representing the lower half.

Attention is now directed to the several figures of the drawings, wherein there is disclosed a nut running tool illustrating the invention. The tool has a general housing 15 of substantially uniform diameter throughout. The tool is of relatively light weight and small diameter, whereby it may be comfortably held in one hand during operation.

Supported in the housing is a conventional air driven motor of the slidable vane type. It includes the usual rotor 16 which rotates in a chamber 17 defined by a surrounding liner 18. Radially slidable in the rotor are the usual air driven vanes 19 which sweep the surrounding wall of the liner as the rotor rotates. The rotor is supported by means of an upper shaft end 21 thereof in a bearing 22 seated in a bearing block 23; and it is further supported by means of a lower drive shaft end 24 thereof in a bearing 25 seated in a bearing block 26.

Operating air is supplied to the motor from a suitable source which is connected by a main supply valve 27 and an associated hose line 28 to a fitting 29. The latter is threaded in an inlet passage 31 provided in a backhead section 32 of the housing.

Flow of operating air to the motor from the inlet 31 is controlled by means of a manually operable throttle valve 33. The latter is normally pressed by means of a return spring 34 to closed condition over a valve seat opening 35, whereby flow of operating air from the inlet 31 to the motor is normally shut off. A manually actuable lever 36 is provided to operate the throttle valve. The lever is pivoted at 37 to a ring 30 clamped about the lower end of the housing; and the lever extends upwardly in close substantially parallel relation to the housing for almost the full length of the tool. The upper end of the lever terminates in a hook formation 38, the free end 39 of which depends downwardly in a slot 41 of the backhead. The hooked or free end 39 is radially slidable in the slot when the lever 36 is actuated relative to the housing. A band retainer 42, fixed about the backhead and covering over the lower half of the slot 41, blocks the hooked end 39 of the lever against radial escape from the slot. The lever may be readily removed from the slot by releasing the lever from its pivoted connection 37, and then lifting it upwardly to enable the hooked end 39 to be slipped clear of the retainer band 42 through the upper end of the slot. The lever 36 is broad and flat between its ends. An externally projecting stem portion 43 of the throttle valve is pressed under the load of the valve spring 34 into constant abutment with an upper flat area of the lever, so that in the seated condition of the throttle valve the hooked end 39 of the lever is pressed outwardly into abutment with the band retainer 42, as appears in FIG. 1.

The foregoing arrangement of the throttle valve in a nut running tool is of decided advantage. The extension of the lever 36 for substantially the full length of the tool, its broad flat nature, and its constant abutment against the stem of the throttle valve enable the operator to manually grip the tool and to comfortably hold it for operation in one hand anywhere along substantially the full length of the tool.

When the throttle valve is held open by means of manual pressure exerted upon the lever 36, pressure air flows through the throttle valve to a control valve chamber 44, from where it then flows around a control valve 45 and through a valve seat opening 46 formed in a valve block 47 to a passage 48 in the latter. From passage 48, the air flows through a passage 49 in the liner 18 to the motor chamber 17. Air spent in operating the motor is rapidly exhausted through side vents at 51 of the housing.

Figure 1A:
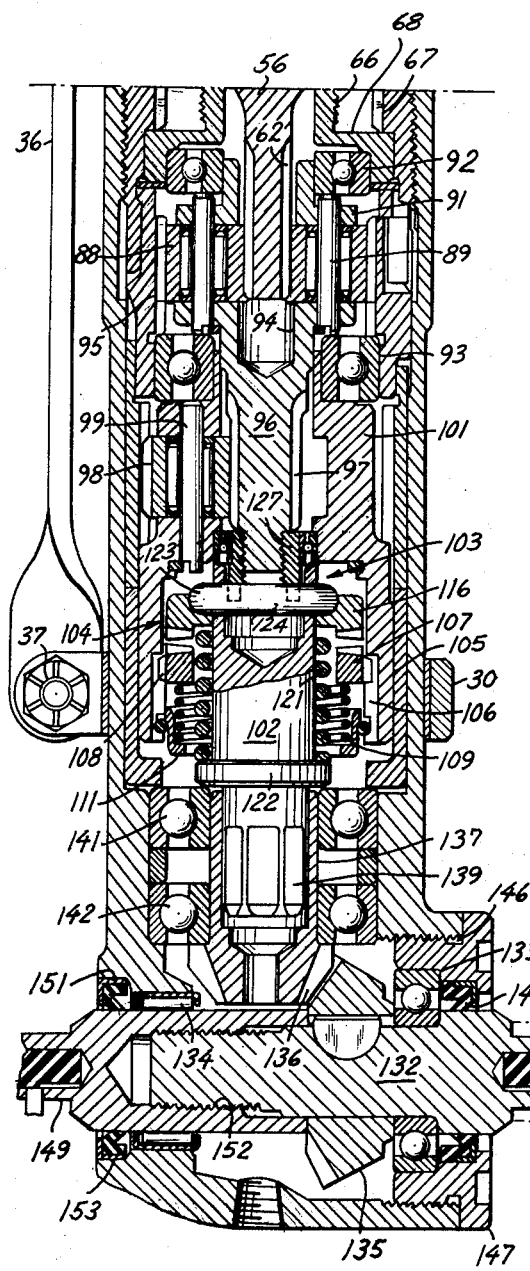

The motor drives or rotates a main clutch 52. The latter is a spring loaded, high torque cam release clutch (FIGS. 1, 1A, 8). It includes a driving clutch part 53 which is splined in a fixed position to the motor drive shaft 24. Incorporated in this clutch part 53 is a plurality of cam rollers 54 which are normally engaged by cam jaws 55 of a disengageable or driven clutch part 56. The latter is axially disengageable from clutch part 53; and it is guided in this movement by an extended reduced smooth end 57 of the drive shaft. This end depends with a slide fit in an axial bore 58 of clutch part 56.

Clutch part 56 is supported for rotation in bearings 59 carried in a bearing cup 61. A stem portion of clutch part 56 depends axially through the bottom of the bearing cup and is provided with elongated splines 62 for driving connection with a work load. The work load, later to be described, is represented by mechanisms housed in the lower half (FIG. 1A) of the tool. Clutch part 56 is normally held engaged to its counterpart 53 by means of a compression spring 63. The latter surrounds the bearing cup 61 and is confined between on overhanging annular lip 64 of the cup and the surface of a ring nut 65. The latter is threadable along a stationary screw 66 which freely surrounds the depending upper portion of the splined stem 62 of clutch part 56. The ring nut enables an adjustment to be made of the compressive force of the spring 63 upon the clutch part 56.

Means is provided which enables this adjustment to be made from the outside of the housing. To this end there is provided a rotatable cylinder 67 in surrounding relation to the main clutch and to the screw 66. The cylinder bears at its lower end upon the flat surface of a radially enlarged base portion 68 of the screw. The cylinder has a ring of straight spline slots 69 at its lower end with which relatively shorter peripheral splines 71 of the ring nut 65 are slidably engaged for longitudinal movement, so that upon rotation of the cylinder in one direction or the other the ring nut is caused to be threaded accordingly along the screw. An adjustment gear 72 rotatably supported in the housing wall is manually operable by means of a key, not shown, from the outside of the housing; and when it is operated, it cooperates with a rim gear 73 of the cylinder to rotate the latter accordingly.

When the work load offers a predetermined resistance to rotation by the main clutch, the lower clutch part 56 is caused to be completely disengaged from the upper clutch part 53 against the resisting force of the spring 63 by means of a reactionary camming action of the rollers 54 relative to the cam jaws 55. Follower means cooperates with the disengaging movement of clutch part 56 to automatically shut off operating air to the motor as the latter clutch part fully disengages; and it serves to hold the latter clutch part in fully disengaged condition until the operator intervenes.

The follower means (FIGS. 1, 8) includes an elongated slide rod 74 slidably disposed in an axial bore 75 extending through the rotor and through both shaft ends of the rotor. The lower end of the rod is journaled in a bearing 76 seated at the bottom of the axial bore 58 of clutch part 56. The upper end of the slide rod carries a bearing cup 77 in which is journaled a reduced end of a cylindrical stem 78 of the control valve 45. The latter valve is of disc form. The stem 78 extends slidably through a bushing 79 fitted in the valve block 47, and it further extends axially through the control valve seat opening 46. The control valve 45 is normally held, because of the engaged condition of the main clutch 52, raised above its seat 40. The distance which it is held above its seat is a little greater than the depth of engagement of the rollers 54 with the jaws 55 of the main clutch. Accordingly, when the control valve is seated and held seated, the slide rod 74 will hold the lower clutch part 56 in a fully disengaged condition clear of the upper clutch part 53, as appears in FIG. 8.

A control valve spring 81 anchored over an axial boss 82 of the control valve and compressed between the control valve and an overhead wall 83 of the control valve chamber 44 constantly exerts a downward force through the control valve and slide rod upon the lower clutch part 56; but such spring force is insufficient to overcome the opposing force of the clutch spring 63. The control valve spring 81, however, relaxes immediately in response to any disengaging movement of the lower clutch part 56 so as to cause the control valve 45 to move towards its seat and forcefully follow the downward movement of the latter clutch part.

Means is provided to cause an abrupt seating action of the control valve 45 following a slight movement thereof pursuant to disengaging movement of the lower clutch part 56. To this end, the valve block 47 has an annular wall 84 which rises upwardly for a short distance around the control valve seat 40. The length of the valve stem 78 is such that the undersurface of the control valve has a normal position below the rim 85 of the surrounding wall 84; and the control valve is disposed so that a slight clearance 86 is provided between this wall 84 and the periphery of the control valve. The slight clearance 86 avoids frictional engagement of the control valve relative to the wall 84 which might otherwise tend to retard the seating action of the valve. A plurality of vertical end slots 87 are provided in the wall 84. These slots allow air entering the control valve chamber 44 above the control valve to flow around the latter to the passages leading to the motor chamber.

It can be seen by this construction that, when the control valve is caused to move under the influence of its return spring 81 slightly downward relative to the surrounding wall 84 toward its seat in response to disengaging movement of the lower clutch part 56, flow of air through the slots 87 will become restricted. This restriction of air flow causes a pressure differential to rapidly develop in the control valve chamber 44 above the control valve relative to a relaxed condition which rapidly develops below the control valve because of the exhausting action of the motor. Consequent upon this differential pressure build-up in the control valve chamber, the control valve is forced to abruptly close upon its seat and to pressure the slide rod 74 downward against the rapidly disengaging lower clutch part 56 so as to carry the latter to a completely disengaged condition clear of its counterpart 53, as appears in FIG. 8. As long as the throttle valve 33 remains open, the pressure exerted by air entering the control valve chamber over the surface of the seated control valve is relatively greater than that of the opposing clutch spring 63, so that the control valve remains seated and the main clutch continues to be held disengaged by the slide rod until the operator intervenes. The operator may quickly bleed off the air from the control valve chamber 44 through the open throttle valve 35 by turning the main supply valve 27 to vent condition. When the air pressure over the control valve is relaxed relative to the opposing force of the clutch spring 63, the latter functions to simultaneously restore the main clutch to engaged condition and to open the control valve. The control valve spring 81 in the latter action functions to cushion the restoring movement of the control valve.

The movement of the lower clutch part 56 to a completely disengaged condition and the consequent follow-up movement of the slide rod 74 therewith to hold the lower clutch part fully disengaged occur simultaneously, with the result that no ratcheting is experienced by one part of the main clutch relative to the other as these clutch parts disengage.

The work load mechanisms, earlier mentioned, to which the main clutch 52 is drivingly connected include a first stage of planetary or reduction gearing (FIG. 1A) for which the splined portion 62 of the main clutch stem serves as a sun gear. This sun gear drivingly engages planet gears 88 which are rotatably supported by means of pins 89 in a spindle cage 91. The latter is journaled at its upper end in a bearing 92, and bears at its lower end upon the inner race of a bearing 93. The clutch stem 62 depends in a recess 94 axially of the spindle cage; which recess is deep enough to allow for axial sliding movement of the clutch stem when the associated clutch part 56 disengages. In this disengaging movement the clutch stem slides axially relative to the planet gears 88. The planet gears are meshed with a surrounding non-rotatable or fixed ring gear 95 for relative rotation. The spindle cage 91 is rotated by the sun gear 62 in conventional manner through the cooperation of the planet gears with the fixed ring gear. The spindle cage is defined at its lower end by means of a driving spindle 96.

This driving spindle has a straight splined intermediate portion (FIGS. 1A, 2) which defines a sun gear 97 of a second stage of planetary or reduction gearing. This sun gear drivingly engages planet gears 98 which are rotatably supported by means of pins 99 in a rotary cage 101. The planet gears 98 are meshed with a surrounding non-rotatable or fixed ring gear 90 for relative rotation. The rotary cage 101 is rotated by the sun gear 97 in conventional manner through the cooperation of the planet gears 98 with the fixed ring gear 90. The cage 101 is disposed in its upper portion in surrounding relation to the driving spindle 96. It is journaled at its upper end in the bearing 93 and in part sleeves a portion of the driving spindle. The driving spindle is also normally drivingly coupled directly to a work spindle 102 by means of a low torque cam release kick-out clutch 103. When this kick-out clutch is caused to disengage and release the direct driving connection of the driving spindle 96 with the work spindle 102 in a manner hereinafter to be described, a normally disengaged non-torque responsive shift clutch 104 is caused to automatically engage the rotary cage 101 drivingly with the work spindle, so that the work spindle is then caused to be driven by the driving spindle 96 indirectly through the second planetary stage.

The rotary cage 101 has an enlarged depending cylinder or barrel portion 105 which is open at its bottom and freely surrounds the work spindle. This barrel portion has a ring of internal straight splines 106. A driving part 107 (FIGS. 1A, 2, 3, 6) of the shift clutch is formed with a peripheral ring of relatively shorter splines 108 which are slidably engaged with the splines 106 of the barrel portion of the rotary cage. By means of this spline arrangement the driving shift clutch part 107 has axial sliding movement relative to the rotary cage and is also adapted to be carried about by means of the latter. This shift clutch part 107 freely surrounds the work spindle 102 and rests upon a coil spring support 109. The latter is seated in an annular cup retainer 111. The cup retainer has a peripheral lip which limits upon a snap ring 112 seated in an internal groove of the splines of the rotary cage. The shouldered upper ends of the splines 106 of the rotary cage cooperate with corresponding shoulders 113 of the splines 108 of the shift clutch part 107 to limit the extent of upward axial movement of the latter.

Figure 2:
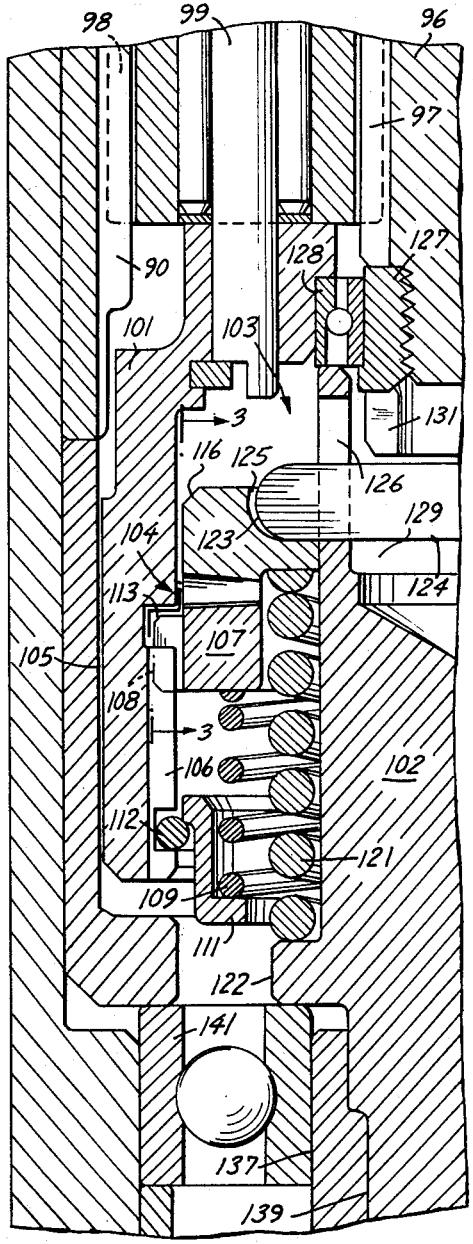
FIG. 2 is a fragmentary sectional enlarged operated view showing the kick-out clutch in disengaged condition, and showing the shift clutch in engaged condition.
Figure 3:
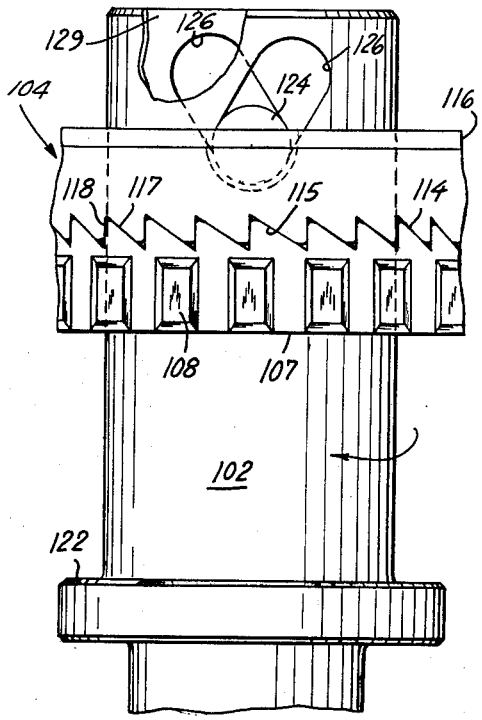
FIG. 3 is an enlarged detail view taken on the line 3—3 of FIG. 2, disclosing the shift clutch as held in engaged condition by the driving pin which is frictionally locked at the bottom of helical openings in the work spindle.
Figure 4:
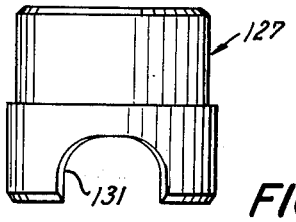
FIG. 4 is an elevational detail view of the driving member of the kick-out clutch.
Figure 5:
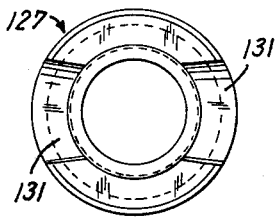
FIG. 5 is a bottom end view of FIG. 4.

Shift clutch part 107 has a ring of face teeth 114 which are designed to engage a complementary ring of face teeth 115 formed on a driven part 116 of the shift clutch so as to drive the latter part in only one direction, here in a clockwise direction (FIGS. 1A, 2, 3). In this respect, each face tooth of the driving clutch member 107 has an inclined upper surface 117 which progressively rises in a clockwise direction to provide at its left a vertical shoulder 118; and each face tooth of the driven clutch member 116 has a complementary mating formation, as appears in FIG. 3. The teeth of the shift clutch are such that this clutch in its engaged condition does not disengage during the operation of the tool when experiencing torque overload.

The driven shift clutch member 116 slidably sleeves the cylindrical surface of the work spindle 102. It is seated atop a clutch spring 121. This spring sleeves the work spindle and limits at its bottom upon a collar 122 of the latter. This spring normally holds the driven shift clutch member 116 disengaged from and spaced clear above the driving shift clutch member 107, as appears in FIG. 1A. Spring 121 further holds the driven shift clutch part seated at all times against rounded end portions 123 of a cylindrical driving pin 124. The driven shift clutch part 116 has a pair of diametrically opposed surface pockets 125 complementing the rounded end portions 123, and in which pockets the latter ends are seated.

The driving pin 124 forms a part of the kick-out clutch 103. The latter includes as a driven part thereof the upper end of the work spindle 102. In this respect the upper end of the work spindle has a pair of opposed helical side openings or tracks 126 through which the end portions of the driving pin project. The driving pin is normally held by the force of the spring 121 seated at the upper ends of the helical openings, as in FIG. 1A. The kick-out clutch further includes a driving member 127 (FIGS. 1A, 2, 4, 5) which is threaded fast upon the end of the driving spindle 96 for rotation with the latter as a unit. The upper end of the driving kick-out clutch part 127 is supported in the inner race of a bearing 128, the outer race of which bearing is seated in an axial recess of the rotary cage 101. The lower end of the driving kick-out clutch part 127 depends freely into an upper end recess 129 of the work spindle; and it is formed with a pair of diametrically opposed cam faced jaws 131 which normally seat upon the mid-area of the driving pin 124. The jaws are of shallow depth relative to the diameter of the driving pin. The driving pin is yieldably held by the force of the clutch spring 121 seated in the jaws 131.

In the foregoing arrangement of the kick-out clutch 103 and the shift clutch 104 relative to the work spindle 102, when the work spindle experiences a predetermined resistance to rotation, the cam jaws 131 cooperate with the cylindrical surface of the driving pin 124 to force the latter down the helical openings 126 relative to the jaws 131. Under the influence of this torque reaction the driving pin, which is of low inertia, eventually rides completely out of the jaws 131 and seats at the bottom of the openings 126 to thus free the driving spindle 96 from its direct driving connection with the work spindle 102, as appears in FIG. 2. In its movement down the helical openings the driving pin carries the driven shift clutch member 116 with it against the opposing pressure of clutch spring 121 into contact with the driving shift clutch member 107. The latter is cushioned in this action by its spring support 109. When the driven shift clutch member contacts the driving shift clutch member, the driving pin is not as yet free of the cam jaws 131 and continues to rotate the driven shift clutch member for several degrees, whereby the toothed face 115 of the driven shift clutch member is caused to ride momentarily relative to the corresponding toothed face 114 of the driving shift clutch member. As the teeth of the driven shift clutch member obtain an axial overlapping relation to those of the driving shift clutch member, the driving pin moves completely out of the cam jaws 131 to the bottom of the helical openings 126. With the movement of the driving pin to the bottom of the helical openings the speed of rotation of the driven shift clutch member 116 is slowed relative to that of the driving shift clutch member 107 which is being carried about by the rotary cage 101. Accordingly, consequent upon movement of the driving pin to the bottom of the helical openings, the teeth of the driven shift clutch member are caused to be drivingly or positively engaged by those of the driving shift clutch member. Rotation of the driving spindle 96 is then transferred through the rotary cage 101, the engaged shift clutch 104 and the driving pin 124 to the work spindle 102.

The driving engagement of the shift clutch members occurs upon movement of the driving pin to the bottom of the helical openings and while the driving pin is still tending to force the work spindle in a clockwise direction, so that subsequent continued rotation of the latter by the engaged shift clutch binds or holds the driving pin frictionally at the bottom of the helical openings 126 between the walls of the latter, thus preventing the driving pin from restoring upwardly under the force of the clutch spring 121. Following the engagement of the shift clutch, the work spindle 102 will be caused to continue to rotate at a slower rate of speed but with higher torque. The transfer of the driving action of the driving spindle 96 through the rotary edge 101 to the work spindle 102 occurs smoothly and without shock to the work spindle, for the transition takes place rapidly and while the work spindle is still being acted upon in a clockwise direction under the influence of the rapidly spiraling driving pin during the shift action.

As earlier explained, when the kick-out clutch 103 experiences a predetermined torque overload, the driving member 127 thereof becomes fully disengaged from the driving pin 124 and from the work spindle 102; so that subsequently and while the work spindle is being driven by the engaged shift clutch 104, the driving member 127 of the kick-out clutch rotates freely and without any ratcheting action relative to the driving pin or the work spindle.

The work spindle is drivingly associated with a work driving shaft 132 (FIG. 1A). The latter is supported for rotation about a horizontal axis in bearings 133, 134, and at right angles to the vertical axis of the housing of the tool. A bevel gear 135 keyed to the work shaft 132 is meshed with a bevel gear 136. The latter has a vertical sleeve portion 137 having an internal polygonal recess in which is seated a complementary polygonal depending portion 139 of the work spindle. The sleeve portion 137 of the bevel gear 136 is supported in a pair of bearings 141, 142 which are seated in the housing. The inner race of the upper bearing 141 of the pair serves as a bearing support for the collar 122 of the work spindle.

The work shaft 132 has a socket retaining portion 143 projecting externally from the housing. Detachably mounted on this external portion is a fastener socket 144 adapted for reception of a nut. Suitable means is provided, as at 145 for releasably retaining the socket on the work shaft.

The work shaft 132 is arranged in the housing in such manner that it may be readily removed for replacement or for repairs. To enable this, an enlarged opening 146 is provided in the side wall of the housing through which the work shaft and its gear 135 may be removed. Threaded in this opening is a plug member 147 which serves to retain the work shaft in the housing. The plug has an inner recess which serves as a seat for the outer bearing 133 that supports the work shaft. The plug has an axial opening provided with an annular seal 148 through which seal the external portion 143 of the work shaft extends.

The work shaft also carries at its opposite end a second socket retaining portion 149 which projects through an opening 151 at the opposite side of the housing. This second socket retainer has an internally threaded recessed portion 152 which is threaded fast upon a threaded end of the work shaft. A knock-out seal plug 153 surrounding the second socket retainer is fitted into the side opening 151.

The nature of the work shaft is such that the socket 144 at the right side is used for driving fasteners having right hand threads. A socket, not shown, carried by the socket retainer 149 at the left may be used for driving fasteners having left-hand threads, or for loosening threaded fasteners having a limited degree of tightness.

In the operation of the tool, the operator grips the tool in one hand anywhere along the length of the throttle lever 36. In the normal condition of the tool (FIGS. 1, 1A), the main clutch 52 and kick-out clutch 103 are engaged, while the shift clutch 104 is fully disengaged. After engaging one of the end sockets, which normally will be the socket 144, to a fastener such as a nut intended to be driven "home," the operator manually squeezes the throttle lever inward to open the throttle valve 33. Operating air, flowing through the throttle valve around the control valve 45 and through the associated passages, operates the motor 16. Air spent in operating the motor is rapidly exhausted by the latter through the side vents 51 so that it will not interfere with the operating speed of the motor.

Operation of the motor is transmitted through the main clutch 52 and first planetary stage to the driving spindle 96. The latter thereupon acts to directly drive the work spindle 102 through the kick-out clutch 103 at high speed and with low torque; and simultaneously with such action to directly drive the rotary cage 101 at a relatively low speed and with high torque. The high speed and low torque are transmitted by the work spindle 102 through the work shaft 132 to the nut. The nut is accordingly rundown rapidly to seated condition to an initial pre-determined tightness.

During the time that the work spindle 102 is being driven through the engaged kick-out clutch 103, the driving part 107 of the shift clutch is being carried about by the rotary cage 101, and the driven part 116 of the shift clutch is being rotated with the work spindle by means of the driving pin 124. Since the driven part 116 of the shift clutch is normally held clear of the driving part of the shift clutch by means of the clutch spring 121, no ratcheting action takes place between the parts of the shift clutch during the time that the work spindle is being driven by the kick-out clutch.

When this initial tightness of the nut is reached, the torque resistance of the nut is transmitted back to the kick-out clutch 103. Where upon this action, the latter fully disengages, as earlier described, to fully release the direct driving connection of the driving spindle 96 from the work spindle 102 and to drivingly connect the driving spindle indirectly with the work spindle 102 through the second stage of reduction gearing and the shift clutch 104. Consequent upon this action, the work shaft 132 is caused to rotate with low speed but with high torque to drive the nut for its last few turns "home" to an exact and predetermined degree of tightness.

The instant that this exact final degree of tightness is reached, the torque resistance of the nut to further rotation reacts back through the shift clutch 104 and both stages of planetary gearing to the main clutch 52 to cause the latter to disengage in the manner earlier explained.

The control valve 45 and slide rod 74 immediately respond to the disengaging action of the main clutch, and cooperate in this action to simultaneously complete the disengagement of the main clutch 52 and to shut off operating air so as to stop the motor. Stopping the motor and complete or full disengagement of the main clutch occur simultaneously. The main clutch disengages without any ratcheting action taking place, as earlier explained. Accordingly, there is no further turning of the nut after the latter has been driven "home" to the exact torque at which the main clutch has been set to disengage.

Following stoppage of the motor, the kick-out clutch 103 is caused to re-engage under the influence of its spring 121. The motor, however, remains stopped and the main clutch 52 is held disengaged because the air pressure in the control valve chamber 44 holds the control valve seated against the opposing force of the main clutch spring 63. The control valve chamber may be bled by the operator of pressure air through the main line supply valve 27, as earlier described, to permit the control valve 45 to restore to its normal open condition and thereby allow the main clutch to re-engage or restore under the influence of its spring 63.

It is to be further noted that if the control valve 45 and the slide rod 74 were omitted, the described operation of the kick-out and shift clutches would not be affected; but in such an event upon disengagement of the main clutch, the motor would continue to operate and the driving member 53 of the main clutch would be caused to ratchet relative to the driven member 56 until the operator intervened to remove the tool from the "finally" tightened nut. The slide rod and control valve cooperate with each other in the illustrated construction of the tool to fully disengage the main clutch and simultaneously stop the motor so as to avoid such ratcheting action.

While an embodiment of the invention has been illustrated and described in detail, it is to be expressly understood that the invention is not limited thereto. Various changes may be made in the design and arrangement of its parts without departing from the spirit of the invention; and it is intended, therefore, to claim the invention not only as shown and described herein but also in such forms and modifications as may reasonably be construed to fall within the spirit of the invention and the scope of the appended claims.

What is claimed is:

1. A nut running tool having automatic torque change over and automatic power shut off, comprising a work spindle, a reduction gearing first stage, a motor, a heavy torque cam release main clutch drivingly coupling the motor to the first stage, a reduction gearing second stage, the first stage carrying a driving spindle drivingly connected to the second stage, a low torque cam release clutch normally drivingly coupling the driving spindle with the work spindle adapted to fully disengage upon realizing a predetermined torque overload, a normally fully disengaged shift clutch adapted upon engagement to drivingly couple the second stage with the work spindle, means responsive to release of the low torque cam release clutch to engage the shift clutch, and means responsive to release of the main clutch to shut off operating power to the motor.

2. A nut running tool according to claim 1, having a work shaft carrying a socket adapted for engagement with a threaded fastener, and angle gearing drivingly engaging the work shaft with the work spindle at an angle relative to the latter.

3. A nut running tool according to claim 1, having an elongated housing of cylindrical form of a diameter adapted to be gripped in one hand, a spring loaded throttle control valve for causing flow of operating power to the motor having an operating stem portion projecting externally of the housing, and manually operable lever means for actuating the operating stem extending externally of the housing for substantially the length of the latter and in close parallel relation thereto, the lever being manually operably substantially anywhere along its length.

4. A nut running tool according to claim 1, wherein the low torque cam release clutch includes a driving member fixed upon the driving spindle and having a pair of opposed cam jaws, a pair of opposed helical openings in the work spindle, a driving cam pin normally seated in part in the helical openings and in part in the cam jaws, and a clutch spring yieldably holding the driving pin so seated in the cam jaws and seated at upper ends of the helical openings.

5. A nut running tool according to claim 4, wherein the shift clutch includes a driving part carried by the second stage having a ring of face teeth, and a driven part slidably sleeving the work spindle, the driven part having a driving connection with the driving pin and being continuously held in this relation by the clutch spring, and the clutch spring normally yieldably supporting the driven part in spaced relation above the driving part.

6. A rotary tool for running down a threaded fastener with high speed and low torque to an initial tightness, then automatically shifting its operation to run the fastener with low speed and high torque to a final tightness, and then automatically stopping its operation when the latter condition is reached, comprising: a work spindle adapted for connection with a work load; a first stage of planetary gearing; a motor; a main cam disengageable clutch adapted to disengage upon realizing a predetermined overload, the main clutch drivingly coupling the motor with the first planetary stage; a second stage of planetary gearing; the first stage having a driving spindle drivingly splined to the second planetary stage; a second cam disengageable clutch adapted to fully disengage upon realizing a predetermined overload less than that required to cause disengagement of the main clutch; the second cam disengageable clutch drivingly coupling the driving spindle with the work spindle; a normally fully disengaged shift clutch adapted upon engagement to drivingly couple the second planetary stage with the work spindle; means responsive to disengagement of the second cam disengageable clutch to engage the shift clutch; and means responsive to disengagement of the main clutch to shut off operating power to the motor.

7. In a rotary nut running tool, including a stage of planetary gearing and a work spindle, a driving spindle having a continuous driving connection with the stage of planetary gearing and having a releasable direct driving connection with the work spindle, a clutch between the planetary gearing and the work spindle normally in a completely disengaged condition, and means for acting automatically in response to overloading of the work spindle to simultaneously disconnect the driving connection of the driving spindle completely from the work spindle and engage the clutch so as to drivingly connect the planetary gearing with the work spindle.

8. In a rotary nut running tool including a stage of planetary gearing, a work spindle, a driving spindle having a continuous driving connection with the stage of planetary gearing and having a releasable driving connection with the work spindle, means for acting automatically in response to overloading of the work spindle to simultaneously release the driving connection of the driving spindle fully from the work spindle and drivingly connect the driving spindle indirectly through the stage of planetary gearing with the work spindle, and including a motor drive having a releasable driving connection with the driving spindle, means for acting in response to overloading of the work spindle when the latter is drivingly connected with the driving spindle through the stage of planetary gearing to release the driving connection of the motor drive with the driving spindle and simultaneously with the latter action to shut off operating power to the motor.

9. In a rotary nut running tool as in claim 8, wherein the releasable driving connection of the driving spindle with the work spindle is a low torque releasable kick-out cam clutch, and the releasable driving connection of the motor with the driving spindle is a heavy torque releasable roller cam jaw clutch.

10. In a rotary nut running tool including a motor drive, a work spindle having a driving connection with a nut running socket, a first stage of planetary gearing having a driven connection with the motor and carrying a driving spindle, a second stage of planetary gearing having a splined driven connection with the driving spindle, a torque release kick-out clutch normally coupling the driving spindle with the work spindle, a normally fully disengaged shift clutch adapted upon engagement to drivingly couple the second planetary stage with the work spindle, and shift means for automatically fully disengaging the kick-out clutch to fully release the driving spindle from the work spindle upon the driving spindle realizing a predetermined torque overload and for simultaneously with such action engaging the shift clutch.

11. In a rotary nut running tool according to claim 10, wherein a main torque release clutch normally couples the motor drive with the first planetary stage and is adapted to disengage upon realizing a torque overload greater than that required to effect release of the kick-out clutch.

12. In a rotary nut running tool according to claim 11, wherein means is provided for shutting off the flow of operating power to the motor automatically in response to disengaging action of the main clutch.

13. A change speed transmission comprising a work spindle, a driving spindle, low torque release clutch means engaging the driving spindle with the work spindle and adapted to be disengaged upon experiencing a predetermined low torque, reduction gearing having a driven connection with the driving spindle, normally disengaged jaw clutch means carried in part by the reduction gearing and in part by the work spindle, means responsive to release of the low torque release clutch means to engage the jaw clutch means, a motor, and a main high torque release clutch drivingly engaging the motor with the driving spindle, the high torque release clutch adapted to disengage upon experiencing a torque overload greater than that required to release the low torque release clutch means.

14. A change speed transmission as in claim 13, including means responsive to disengagement of the high torque release clutch to shut off power to the motor.

15. A change-speed transmission comprising a motor powered driving spindle; reduction gearing having a splined driven connection with the driving spindle; a work spindle; a low torque complete release clutch directly coupling the driving spindle with the work spindle including a driving cam jaw element rotatable with the driving spindle as a unit; a driving pin; a pair of opposed helical openings in the work spindle through which the driving pin transversely extends and along which it is movable; a shift clutch including a driving shift clutch part rotatable as a unit with the reduction gearing; a driven shift clutch part slidable along the work spindle; the driven shaft clutch part having unitary rotary movement with the driving pin; a clutch spring continuously holding the driven shift clutch part unitary with the driving pin and normally holding the driven shift clutch part clear of the driving shift clutch part; the driving pin being normally held by the force of the clutch spring at upper ends of the helical openings and engaged with the driving cam jaw element; the driving cam jaw element being adapted upon being overloaded to cam the driving pin clear thereof and to force it down the helical openings; and the driving pin being adapted in this action to force the driven shift clutch part along with it into engagement with the driving shift clutch part.

16. A change-speed transmission as defined in claim 15, including a motor and a first gear reduction stage having a driven connection with the motor and a driving connection with the driving spindle.

17. A change-speed transmission as defined in claim 16, including a main cam release clutch drivingly coupling the motor with the first gear reduction stage and adapted to release the motor from the latter upon realizing a torque overload relatively greater than that at which the low torque cam release clutch disengages.

18. In a change speed transmission, a work spindle having a recess at its rear and a pair of opposed helical openings in the wall area surrounding the recess, the openings having rear and forward ends, a driving pin ridable in the openings from one end to the other and having its ends projecting from the openings, a driven shift clutch member slidably sleeving the work spindle and having continuous engagement with the ends of the driving pin for unitary movement with the latter, a clutch spring yieldably pressing the driving pin to the rear ends of the openings, a drive shaft carrying a low torque driving cam release clutch member, the latter having cam jaws extending into the recess and having a driving engagement with the pin while the pin is at the rear ends of the openings, the pin being adapted to be cammed out of the jaws and forced to the bottom ends of the openings upon the driven shaft member being overloaded, and the pin in such action being adapted to carry the driven shift clutch member down with it, a driven shift clutch member, a rotary cage carrying the driving shift clutch member at one end and having a driven connection at its other end with the drive shaft, the driven shift clutch member being normally held by the spring clear of the driving shift clutch member, the driven and driving shift clutch members having complementary engageable teeth, and the teeth of the driving shift clutch member being adapted to drivingly engage those of the driven shift clutch member upon the latter being carried downward by the driving pin whereby the work spindle then becomes drivingly engaged by the rotary cage.

19. In change speed transmission as in claim 18, including a motor, and a high torque cam release clutch drivingly engaging the motor with the drive shaft.

References Cited by the Examiner
UNITED STATES PATENTS

| | | | |
|---|---|---|---|
| 1,300,474 | 4/19 | O'Connor | 74—751 |
| 2,235,192 | 3/41 | Bailey | 74—251 |
| 2,986,052 | 5/61 | Eckman et al. | 192—150 |

DAVID J. WILLIAMOWSKY, *Primary Examiner.*

UNITED STATES PATENT OFFICE
CERTIFICATE OF CORRECTION

Patent No. 3,187,860                          June 8, 1965

Roger C. Simmons

It is hereby certified that error appears in the above numbered patent requiring correction and that the said Letters Patent should read as corrected below.

Column 13, line 19, for "driven" read -- driving --; column 14, line 10, for "In change" read -- In a change --.

Signed and sealed this 26th day of October 1965.

(SEAL)
Attest:

ERNEST W. SWIDER
Attesting Officer

EDWARD J. BRENNER
Commissioner of Patents